G. W. DICKINSON.
Micrometer Screw-Gage.
No. 211,975. Patented Feb. 4, 1879.
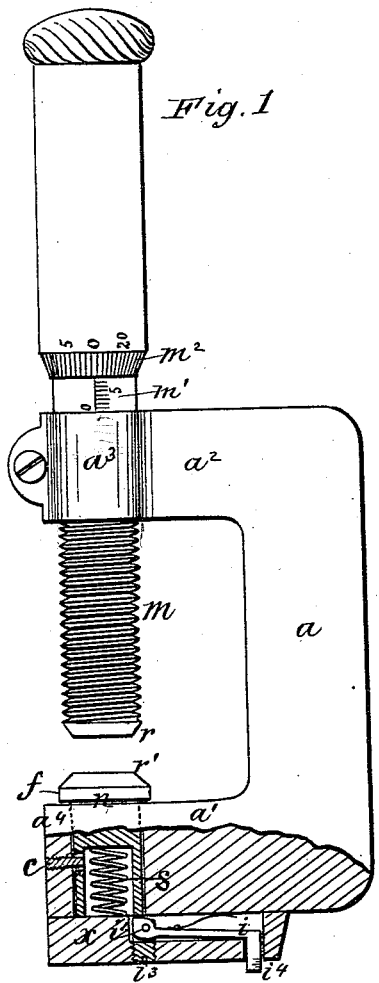
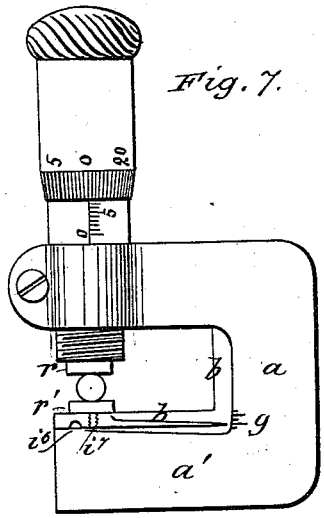
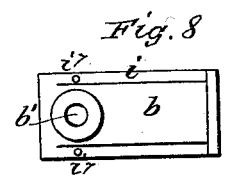
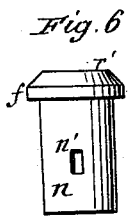
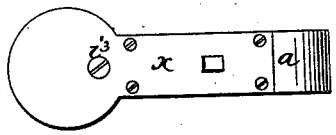
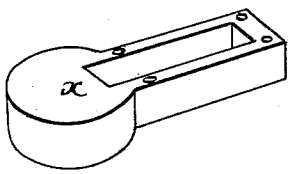
Witnesses:
W. B. Masson
D. P. Cowl
Inventor:
George W. Dickinson
by E. E. Masson
associate atty.

UNITED STATES PATENT OFFICE.

GEORGE W. DICKINSON, OF ASHTABULA, OHIO.

IMPROVEMENT IN MICROMETER-SCREW GAGES.

Specification forming part of Letters Patent No. 211,975, dated February 4, 1879; application filed December 11, 1878.

*To all whom it may concern:*

Be it known that I, GEORGE W. DICKINSON, of the city and county of Ashtabula, and State of Ohio, have invented a new and useful Improvement in Micrometer-Screw Gages, which is fully set forth in the following specification, reference being had to the accompanying drawings, in which—

Figure 1 represents a side elevation of such a gage, with the parts below the crooked line $x\ x$ in section. Fig. 2 represents, in elevation, the lower end of the gage, with a supplemental frame-piece attached. Fig. 3 represents, in perspective, the supplemental frame-piece detached. Fig. 4 represents, in perspective, the adjusting and precision lever with its spring. Fig. 5 represents, in elevation, the fulcrum-block of the precision-lever and the set-screw for adjusting it. Fig. 6 represents, in elevation, the abutment-bar. Fig. 7 represents a gage with a spring-abutment, instead of the yielding bar represented in the previous figures; and Fig. 8 represents, in plan and detached, the abutting-spring shown in elevation in Fig. 7.

The abandonment in the best workshops of haphazard fitting and the constantly-increasing accuracy with which it becomes necessary to construct machinery render handy and reliable instruments for measuring minute linear magnitudes indispensable to machinists, compasses, calipers, and graduated rules being no longer sufficient for the refinement of modern workmanship. Compact and strong micrometer-screw gages of various kinds have been devised to meet this want; but they have failed to satisfy it for various reasons. The simple pocket micrometer-screw gage upon the general plan of that shown in the drawings is preferred for general use; but there is difficulty in bringing its gaging-surfaces into certain contact with the opposite sides of an object to be measured without either compressing the object or flexing the frame of the gage by too great pressure of the screw, which can scarcely be avoided in the ordinary manipulation of the instrument by the stiffened fingers and strong muscles of mechanics. To prevent such undue pressure the milled head for rotating the screw was pivoted to the end of the screw, and a spring friction brake or clutch interposed between them, so that the turning of the milled head should turn the screw with no greater force than was required to overcome the friction of the interposed spring-clutch, the screw stopping whenever the resistance to its motion exceeded such friction, while the milled head might continue turning. This arrangement, while guarding against excessive pressure by the screw, created new difficulties by failing to make provision for varying resistance to the turning of the screw from grit, filings, and other frictional matter, which inevitably gets upon the screw and nut in the pocket and on the work-bench; nor did it make any provision against change in the resistance of the friction-springs from loss of tension, or from the polishing or the abrasion of the rubbing-surfaces.

Another device to secure equal pressure of the gaging-surfaces upon all objects under measurement is to make the micrometer-screw tubular, and to fit into it accurately a sliding rod and certain levers, springs, and graduated indexes. This device is known as the "contact-lever gage;" but, while delicate in its operation, and capable of measuring with great nicety, it has neither the strength, nor compactness, nor the convenience of application requisite for a bench and pocket tool in a machine-shop.

It is often desirable to apply the gage to an object to ascertain its thickness under circumstances where the scale cannot be seen, and to remove the gage for the purpose of reading the measurement. With the ordinary gage this is difficult, because in removing it from the object the friction against the flat end of the micrometer-screw is apt to turn it, and so falsify the measurement; or if the screw be made to fit tight enough in its nut to avoid this cause of error, the delicacy of the gage is so much impaired as to unfit it for nice measurement.

My improvements, which are designed to remedy the aforesaid and other defects in gages, are shown in the drawings in connection with one of the common forms of the pocket and bench micrometer-gage.

The frame of the instrument is made principally of a single piece of steel, and consists of a back, $a$, with a foot-bracket, $a^1$, at one end, and a corresponding head-bracket, $a^2$, at the other end. These brackets, with the back, form a recess wide enough to admit readily the largest object which the instrument is designed to measure. An arm, $a^3$, projects from the end of the bracket $a^2$. This arm is tubular, and forms the nut of the micrometer-screw $m$. On the foot-bracket a corresponding but shorter tubular arm, $a^4$, is formed. This tubular arm makes a socket, into which the abutting-bar $n$ is nicely fitted to slide freely and smoothly but without looseness. On the front end of this bar, and at right angles to its axis, a plane face, $r'$, is formed, to abut against a corresponding plane face, $r$, on the end of the micrometer-screw. Behind the face of the abutting-bar a collar is formed, which, coming into contact with the adjacent end of the arm $a^4$, prevents the bar, when pressed against by the screw, from sliding too far into its socket, and from bearing with undue force against the precision-lever. A set-screw, $c$, in the arm $a^4$ projects into a slot, $n'$, Fig. 6, in the side of the bar $n$, to limit the sliding movement of the bar outward, while its movement in the opposite direction is limited by the collar $f$. The end of the bar within the socket has a recess to receive a helical spring, $s$, Fig. 1, which presses the bar toward the screw, so that its front end is constantly protruded from its socket to the extent limited by the stop $c$, except when pressed back by the screw directly or through an object being measured.

The spring $s$ rests upon a supplemental frame-piece, $x$, attached by screws to the lower or outer edge of the frame. This supplemental frame-piece has a groove formed in its side next the main frame, as seen in Figs. 1 and 3, to receive the precision-lever $i$. This lever turns on a fulcrum-pin, $i^1$, held in two standards on a block, $i^2$. This fulcrum-block is fitted into a socket in the groove of the frame-piece $x$ opposite the end of the abutment-bar, so that the lever resting on its fulcrum may have its short end within the line of motion of the abutment-bar, the end of the lever, at about .03 of an inch outside of the axis of the fulcrum, having a transverse narrow, but slight, protuberance formed on it, for the end of the abutting-bar to bear against. The opposite end of the lever $i$ has an arm, $i^4$, which is placed in an orifice extending from the groove in which the lever lies to the lower edge of the piece $x$, so that as the lever turns on its fulcrum back and forth the end of the arm will alternately be thrust out from and drawn back into the orifice. A spring, $z$, attached to the back of the lever, tends to thrust the arm constantly out of the orifice, so that it is protruded, except when held in, by the abutment-bar pressing on the short end of the lever. The fulcrum-block rests against the end of a set-screw, $i^3$, in the piece $x$. By turning this set-screw the fulcrum can be moved nearer to or farther from the end of the abutment-bar, and by this means the movement of the end of the arm $i^4$ can be adjusted to stand exactly at the entrance to its orifice.

When the abutting-bar has been retracted to any given small distance—say .001 of an inch—from its backward limit of motion, the relative lengths of the two ends of the precision-lever from the fulcrum is, in the example shown, such as to move the longer end, which carries the arm $i^4$, about twenty-five times the distance that the shorter end is moved by the abutting-bar. Thus very minute movements of the abutting-bar may easily be detected, even when far less than .001 of an inch. Of course, the relative length of the two ends of the precision-lever may be varied, according to the minuteness with which it is desired to note differences in measurement.

The nut $a^3$ of the micrometer-screw is divided on one side by a longitudinal slit, through which a clamp-screw passes, by which the nut can be clamped to the micrometer-screw, so as to make it turn easily or very stiffly, as may be required. A fixed scale, the divisions of which are equal to the pitch of the thread of the micrometer-screw, is graduated upon the nut, to measure full turns of the screw; and a rotary scale is graduated on the front end of a tube, which encircles the upper end of the nut, and is attached to the milled head of the micrometer-screw, so that as the screw advances or recedes the tube will move correspondingly along and around the fixed scale, to indicate, by its longitudinal movement, the full turns of the screw on the fixed scale, and, by its rotary movement, the fractions of a full turn on its rotary scale.

This arrangement and graduation of scales being of the usual construction, it is not necessary more particularly to describe them.

Preparatory to working the instrument to take a measurement, it is necessary to see that when the screw is turned to the zero of both its micrometer-scales its gaging-face shall be in contact with the gaging-face of the sliding abutting-bar, and that the latter shall rest upon the spring $s$, with the collar $f$ distant from its bearing on the socket just .001 of an inch in a micrometer graduated, as in the drawing, to thousandths of an inch. The short end of the precision-lever should now be in contact with the end of the abutting-bar, and its arm $i^4$ should be in the outer end of its orifice, which is the zero-point of adjustment. If the arm is not accurately on this zero-point it must be adjusted by turning the set-screw $i^3$ inward or outward, as may be required, to set the fulcrum and make the end of the arm coincide exactly with the zero-plane. The gaging-faces will now be held by the pressure of the abutment-spring $s$ against each other, and this pressure will be the same upon any object held between these faces for measurement as many times as any one chooses to repeat the operation without any danger of variation to an extent that would produce an error of .0005 of an inch in the measurement.

The practical working of the instrument is as follows: The screw being turned back far enough to admit the object to be measured easily into the gap between the two gaging-faces $r$ and $r'$, the abutment-bar, being released from the pressure of the screw, is pushed forward in its socket by the spring $s$ until arrested by the stop $c$. This movement of the abutment-bar releases the index-lever, whose long end is pressed outward by the spring $z$, so that its arm or index protrudes from its orifice a distance sufficient to be easily seen with the eye or felt with the finger. The micrometer-screw is now turned forward to grasp the object to be measured between the gaging-faces, and to press the abutting-bar back against the precision-lever until the face of its arm $i^4$ is drawn back to its zero-point. As the arm approaches this point the screw must be slowly and carefully turned, and instantly stopped when the point is reached. All of the backlash of the index-lever, abutment-bar, screw, and other moving parts is now taken up, and the measurement indicated on the micrometer may be read with confidence that it will not be in error to exceed .0005 of an inch, as the divisions of the micrometer indicating .001 of an inch are .04 of an inch apart, and can, by a careful observer, be divided by ocular estimation into quarters without danger of error of more than half a quarter or one-eighth of one-thousandth of an inch. Such small errors, of course, presuppose the screws to be accurately cut and fitted and the scales to be accurately divided.

The collar gives a firm support to the abutting-bar, so that the turning up of the screw with such unnecessary force as is often used in careless handling will do no harm, as the pressure must be relaxed by turning the screw back, to allow the arm $i^4$ to repass zero, when the screw must again be turned forward to take up all backlash and bring the precision-lever to zero before the measurement is read, if great accuracy is required. But it is often necessary to press with considerable force to flatten a curved piece of thin sheet metal before its thickness can be gaged. In such a case the collar of the abutting-bar must be pressed back against the arm, and the measure indicated on the micrometer-scale must have .001 of an inch added to it to compensate the recession of the face $r'$ of the abutting-bar that distance from its normal zero-point when adjusted by the precision-lever. Such a measurement will not be quite accurate; but it will be close enough to be useful in a large number of cases.

To secure necessary sensitiveness in using the common micrometer-gage the screw must work very freely in its nut. This renders it difficult to gage an object and then remove the instrument to read the measurement, because of the liability of the screw to turn and falsify the measure in the process of such removal.

In my improved gage the screw is held firmly in the nut, as the delicacy of measuring with it is not dependent upon a light touch of the screw, all that being done by the automatic action of the precision-lever; and when an object is gaged the yielding of the abutment-bar allows the instrument to be readily withdrawn and the measurement read on the scale at convenience, without danger of displacing the screw or otherwise falsifying the measure by the operation. The gage of an object can easily be taken in the dark, or when the scale is inaccessible to sight, as the sense of touch will indicate with as much delicacy as the sense of sight when the arm of the precision-lever reaches zero—the position in which all parts are in adjustment and the gaging complete. Then the instrument can be withdrawn from the object and carried to the light to read on its scales the measurement taken in the dark. This feature of my improvement enables those whose vision is defective to take a measure accurately by the sense of touch, and afterward, with the aid of a miscroscope or the eyes of another person, read the measurement on the scales.

The set-screw for adjusting the fulcrum of the precision-lever readily changes the fulcrum to compensate wear of the parts. This enables the user to maintain his gage at all times at the highest standard of accuracy which he desires.

Whenever the instrument is not in use the screw should be turned up to press the collar $f$ against the end of the socket and hold it there to prevent the intrusion of dust or other obstructive matter, and to retract the arm $i^4$ within its recess to protect it from injury.

A simple and effective yielding abutment is made in the form of a strong L-shaped spring, $b$, Figs. 7 and 8, and attached by one limb to the back $a$ of the frame by screws. The free limb of the spring projects over the bracket $a^1$, and near its outer end has a cylindrical projection, on which the abutting face $r'$ is formed. A circular hole in the center of the abutting face receives a steady-pin, $b'$, Fig. 8, to support the outer end of the spring against lateral strains. Each side of the spring has a narrow arm, $i$, Fig. 8, either attached to the front end of the spring by screws, or formed in one solid piece with the spring by running a saw from the angle of the spring to near its outer end along the line of the inner margin of each arm.

To give the arms sufficient flexibility to vibrate freely, each of them is thinned near its outer end by cutting a circular notch, $i^6$, Fig. 7, in its under side. Just outside of the notch each arm is fitted with a set-screw, $i^7$, the lower end of which is shaped like the end of an egg, and forms a fulcrum, on which the arm vibrates. The set-screw should be made of steel and its oval end hardened. A smooth hard pin of steel should also be let into the arm $a^1$ for the set-screw to bear on. The free extremity of each arm is shaped into a pointer, to indicate on the scale $g$, Fig. 7, when an object is properly held in the gage for determining its measure. If the scale were formed on a spring bearing against the end of the arm, and a notch were made in the bearing-edge of such spring opposite the zero-line of such scale, the notch would drop over the end of the arm when the latter reached zero, making an audible click, and thus enable the operator to ascertain by the sense of hearing, as well as sight, when the gage of an object had been properly taken; and if the zero-mark were a rib, corresponding in cross-section and direction to the outer edge of the end of the arm, the sense of touch would detect instantly when they came into line. These arms perform the function of the precision-lever in the mode of applying my invention shown in Figs. 1 and 6.

A recess is, when necessary, formed in the side of the bracket $a^1$ and of the back $a$ for the arms to vibrate in. The arm should be shaped with the abutting-spring, and with it given an elastic, but not too hard, spring-temper; and before hardening and tempering, the free ends of the arms should be bent downward to the maximum distance which it is desired they should vibrate in the working of the gage. The free end of the abutting-spring should also be bent upward about .003 of an inch above its zero-point, which is .001 of an inch above its solid stop on the bracket, so that in gaging an object it will always be pressed downward before the gaging-faces can be put in proper adjustment for taking a correct measurement. The descent of the free end of the abutting-spring will press the set-screws of the precision-arms upon their bearings, and raise correspondingly the free ends of the arms by a multiple movement proportional to the distance of the end of the arm from its fulcrum—the foot of the set-screw.

The motion of the precision-lever could be multiplied by a sector on its end gearing into a pinion which turned an index over a graduated scale, and all the parts of the gage could be variously shaped, otherwise than herein shown, to facilitate a cheaper construction, or to increase strength and durability, without changing the mode of operation of my improvement; but such changes, being the business of the machinist, need not be here described.

I claim in the foregoing—

1. The combination, with the micrometer-screw, of a shifting abutment-bar, $n$, and a precision-lever by which to set it, substantially as described.

2. The combination of the shifting abutment-bar $n$ with a spring, $s$, to press it forward, and a stop, $f$, to limit its movement backward, so that gaging may be done either with a yielding or rigid abutment, as desired, substantially as described.

3. The combination of the yielding abutment with a precision-lever, so arranged that its position to denote the proper adjustment of the gage in measuring an object can be determined by both touch and sight.

4. The combination of the precision-lever, with an adjustable fulcrum or rest, with a shifting abutment-bar, substantially as described.

GEO. W. DICKINSON.

Witnesses:
L. A. WATSON,
E. W. RICHARDS.